USo11251919B2

United States Patent
Zhou et al.

(10) Patent No.: US 11,251,919 B2
(45) Date of Patent: Feb. 15, 2022

(54) PANEL SELECTION FOR USER EQUIPMENT WITH MULTIPLE PANELS

(71) Applicant: QUALCOMM Incorporated, San Diego, CA (US)

(72) Inventors: Yan Zhou, San Diego, CA (US); Tao Luo, San Diego, CA (US); Jung Ho Ryu, Fort Lee, NJ (US); Tianyang Bai, Somerville, NJ (US); Kiran Venugopal, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 16/874,228

(22) Filed: May 14, 2020

(65) Prior Publication Data

US 2020/0366431 A1   Nov. 19, 2020

Related U.S. Application Data

(60) Provisional application No. 62/849,788, filed on May 17, 2019.

(51) Int. Cl.
  *H04W 72/04* (2009.01)
  *H04W 72/12* (2009.01)
  (Continued)

(52) U.S. Cl.
  CPC ........... *H04L 5/0048* (2013.01); *H04W 72/14* (2013.01)

(58) Field of Classification Search
  None
  See application file for complete search history.

(56) References Cited

U.S. PATENT DOCUMENTS

| 10,784,944 B2* | 9/2020 | Cirik | H04W 24/04 |
| 2019/0075014 A1* | 3/2019 | Zhou | H04W 72/042 |

(Continued)

FOREIGN PATENT DOCUMENTS

| CN | 109417717 A | 3/2019 |
| WO | 2018231141 A1 | 12/2018 |
| WO | 2020061953 A1 | 4/2020 |

OTHER PUBLICATIONS

Fraunhofer L., et al., "Enhancements on UE Multi-Beam Operation", 3GPP Draft, R1-1907052-UE Multi-Beam, 3rd Generation Partnership Project (3GPP), Mobile Competence Centre, 650, Route Des Lucioles, F-06921 Sophia-Antipolis Cedex, France, vol. RAN WG1, No. Reno, USA, 20190513-20190517, May 13, 2019 (May 13, 2019), XP051728500, 6 pages, Retrieved from the Internet: URL: http://www.3gpp.org/ftp/Meetings%5F3GPP%5FSYNC/RAN1/Docs/R1%2D1907052%2Ezip. [retrieved on May 13, 2019] pp. 1,3,4.

(Continued)

*Primary Examiner* — Sai Aung
(74) *Attorney, Agent, or Firm* — Qualcomm Incorporated

(57) ABSTRACT

The present disclosure provides signaling for user equipment (UE) panel identification. The UE may have at least a first panel and a second panel. The UE may receive at least one downlink reference signal from a base station. The UE may determine a first mapping of the at least one downlink reference signal to one or more panel identifiers. The UE may receive a configuration of an uplink reference signal resource. Based on the configuration, the UE may transmit an uplink reference signal using a selected panel, the selected panel being associated with a selected panel identifier. The UE may transmit a report including a second mapping between the selected panel identifier and the uplink reference signal. The UE may receive an uplink grant (Continued)

indicating the selected panel associated with the selected panel identifier. The UE may transmit an uplink data channel using the selected panel.

30 Claims, 10 Drawing Sheets

(51) Int. Cl.
*H04B 7/0408* (2017.01)
*H04L 5/00* (2006.01)
*H04W 72/14* (2009.01)

(56) References Cited

U.S. PATENT DOCUMENTS

| | | | | |
|---|---|---|---|---|
| 2020/0119799 | A1* | 4/2020 | Jung | H04B 7/0695 |
| 2020/0267663 | A1* | 8/2020 | Xu | H04W 52/42 |
| 2020/0313747 | A1* | 10/2020 | Xu | H04W 72/046 |
| 2020/0351794 | A1* | 11/2020 | Xu | H04W 72/042 |
| 2021/0007138 | A1* | 1/2021 | Xu | H04L 5/0082 |
| 2021/0144742 | A1* | 5/2021 | Jeon | H04W 74/0833 |

OTHER PUBLICATIONS

International Search Report and Written Opinion—PCT/US2020/033117—ISA/EPO—dated Aug. 3, 2020.

* cited by examiner

PANEL SELECTION FOR USER EQUIPMENT WITH MULTIPLE PANELS

CLAIM OF PRIORITY UNDER 35 U.S.C. § 119

This application claims priority to U.S. Provisional Application No. 62/849,788 titled "ENHANCED PANEL ID REPORT," filed May 17, 2019, which is assigned to the assignee hereof, and incorporated herein by reference in its entirety.

BACKGROUND

Technical Field

The present disclosure relates generally to communication systems, and more particularly, to panel selection for a user equipment (UE) having multiple panels.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a first method, a non-transitory computer-readable medium storing computer-executable instructions for performing the first method, and an apparatus (e.g., a user equipment (UE)) configured to execute the first method are provided. The first method may be performed by a UE having at least a first panel and a second panel. The first method may include receiving at least one downlink reference signal from a base station. The first method may include determining a first mapping of the at least one downlink reference signal to one or more panel identifiers. The first method may include receiving a configuration of an uplink reference signal resource. The first method may include transmitting, in response to the configuration, an uplink reference signal using a selected panel of the first panel or the second panel, the selected panel being associated with a selected panel identifier. The first method may include transmitting a report including a second mapping between the selected panel identifier and the uplink reference signal. The first method may include receiving an uplink grant indicating the selected panel associated with the selected panel identifier. The first method may include transmitting an uplink data channel using the selected panel. The UE may include a plurality of panels, including at least a first panel and a second panel, a transceiver coupled to the plurality of panels, a memory, and at least one processor coupled with the transceiver and the memory and configured to perform the first method. Also, an apparatus may include means for performing the first method.

In another aspect, a second method, non-transitory computer-readable medium storing computer-executable instructions for performing the second method, and an apparatus (e.g., a base station) configured to execute the second method are provided. The second method may be performed by the base station. The second method may include transmitting, at least one downlink reference signal. The second method may include receiving, from a UE having at least first panel and a second panel, a first mapping of the at least one downlink reference signal to one or more panel IDs. The second method may include transmitting a configuration of an uplink reference signal resource. The second method may include receiving, from the UE, an uplink reference signal in response to the configuration. The second method may include receiving, from the UE, a report including a second mapping between a selected panel identifier and the uplink reference signal. The second method may include transmitting an uplink grant indicating a selected panel associated with the selected panel identifier. The second method may include receiving an uplink data channel transmitted from the UE using the selected panel. The apparatus may include a transceiver, a memory, and at least one processor coupled with the transceiver and the memory and configured to perform the second method. Also, an apparatus may include means for performing the second method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
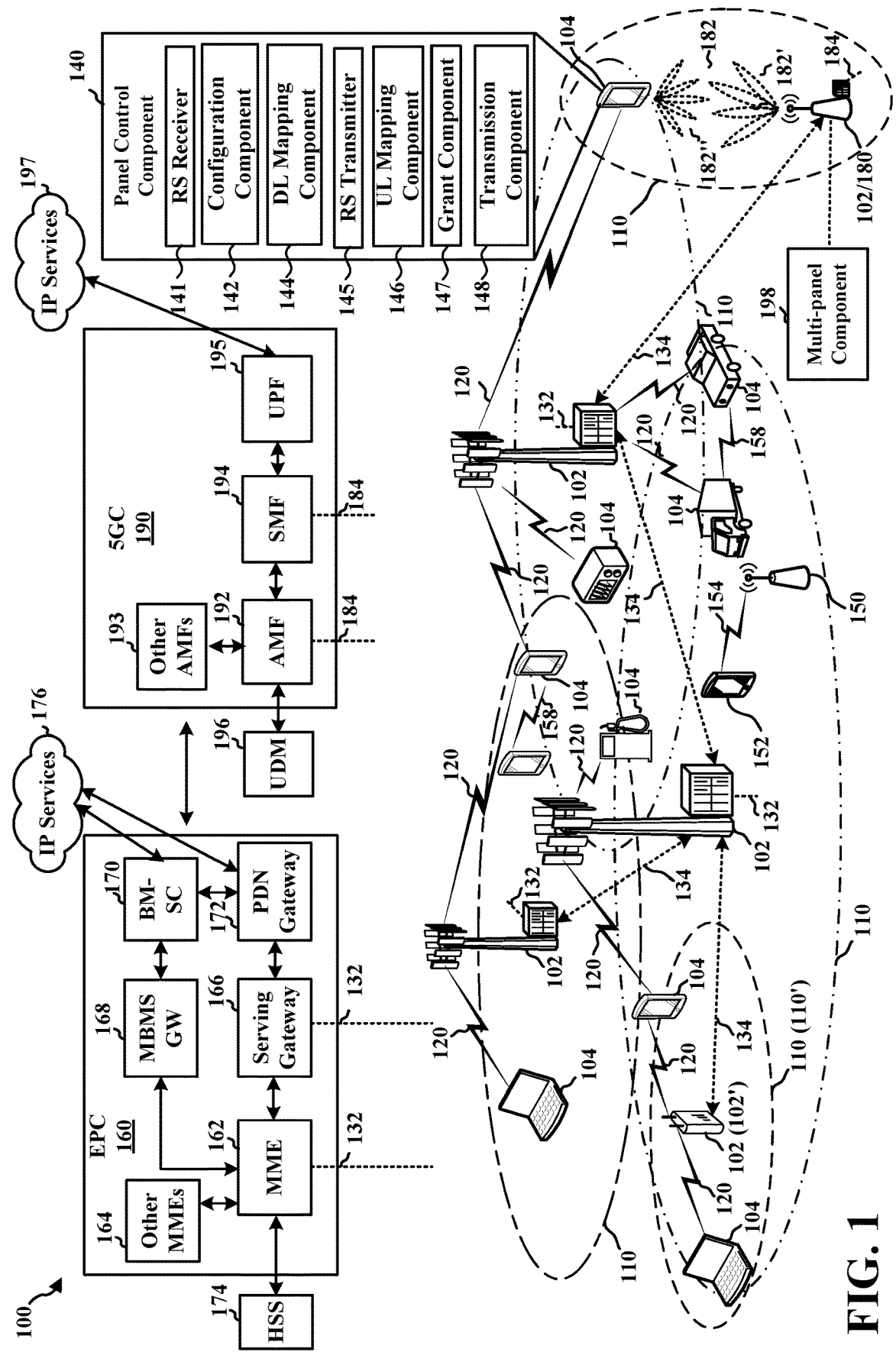
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A multi-panel UE (MPUE) may be a UE that includes multiple antenna groups configured as panels. The terms MPUE and UE may be used interchangeably. An example of an MPUE may include a folding device that includes physical panels that fold with respect to each other. From a wireless communications perspective, however, the concept of an MPUE may be broader and may include any device with multiple antenna groups configured as panels. That is, an MPUE may not be limited to a particular form factor.

An MPUE may provide flexibility in selection of antennas for wireless communications. In particular, the concept of a panel may be used to activate or deactivate certain antennas in order to improve performance and/or save battery power. Generally, multiple panels may be activated at the same time, but a UE does not need to activate multiple panels. In an aspect, although multiple panels may be active, one panel may be selected for uplink transmission using a single beam. In other aspects, multiple beams may be transmitted from multiple panels, or multiple beams may be transmitted from one panel.

In an aspect, communications between the MPUE and a base station may identify a panel for communications. For example, an uplink grant may indicate a panel for the MPUE to use for transmission. A panel identifier (panel ID) may be based on a reference signal transmitted or received using the panel. For instance, one or more panels of the MPUE may receive one or more downlink reference signals, measure the received signals, and transmit a mapping of downlink reference signals to panel identifiers. The mapping may also include a signal quality (e.g., SINR or RSRP) of the received signals. Accordingly, a base station may select a panel based on the mapping.

In an aspect, however, the MPUE may transmit an uplink reference signal. The uplink reference signal may not be associated with a downlink reference signal. Accordingly, a mapping of the uplink reference signal to a panel ID may be unclear. Additionally, when the MPUE transmits a panel mapping, the panel mapping may not be immediately available for use (e.g., to allow either the MPUE or base station to reconfigure).

In an aspect, the present disclosure provides for panel ID reporting that may include at least a second panel mapping transmitted by the MPUE including a mapping of at least one uplink reference signal to a panel identifier. The base station may transmit an uplink grant indicating the panel mapped to the uplink reference signal.

In another aspect, the present disclosure provides for an action time when a mapping of a panel ID to a reference signal becomes ready to use. For example, the action time may be based on a configurable time after a reference signal or mapping report has been received. In another aspect, a mapping report may indicate the action time.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macrocells (high power cellular base station) and/or small cells (low power cellular base station). The macrocells include base stations. The small cells include femtocells, picocells, and microcells.

One or more of the UEs 104 may be an MPUE including at least a first panel and a second panel and a panel control component 140. The panel control component 140 may control activation and deactivation of the panels and perform signaling regarding the configuration and status of the panels. For example, the panel control component 140 may include one or more of a reference signal (RS) receiver 141, a configuration component 142, a downlink (DL) mapping component 144, a RS transmitter 145, an uplink (UL) mapping component 146, a grant component 147, and a transmission component 148. The reference signal (RS) receiver 141 may receive a downlink reference signal. The configuration component 142 may receive a configuration of an uplink reference signal resource. The downlink mapping component 144 may map downlink reference signals to panel identifiers and transmit a first report including a first mapping of downlink reference signals to panel identifiers. The RS transmitter 145 may transmit an uplink reference signal using a panel of the first panel or the second panel. The panel may be associated with a panel identifier. The UL mapping component 146 may map uplink reference signals to panel identifiers and transmit a second report including a second mapping between the panel identifier and the uplink reference signal. The grant component 147 may receive an uplink grant indicating a selected panel for transmission using the panel identifier. The transmission component 148 may transmit an uplink data channel using the selected panel.

Figure 10:
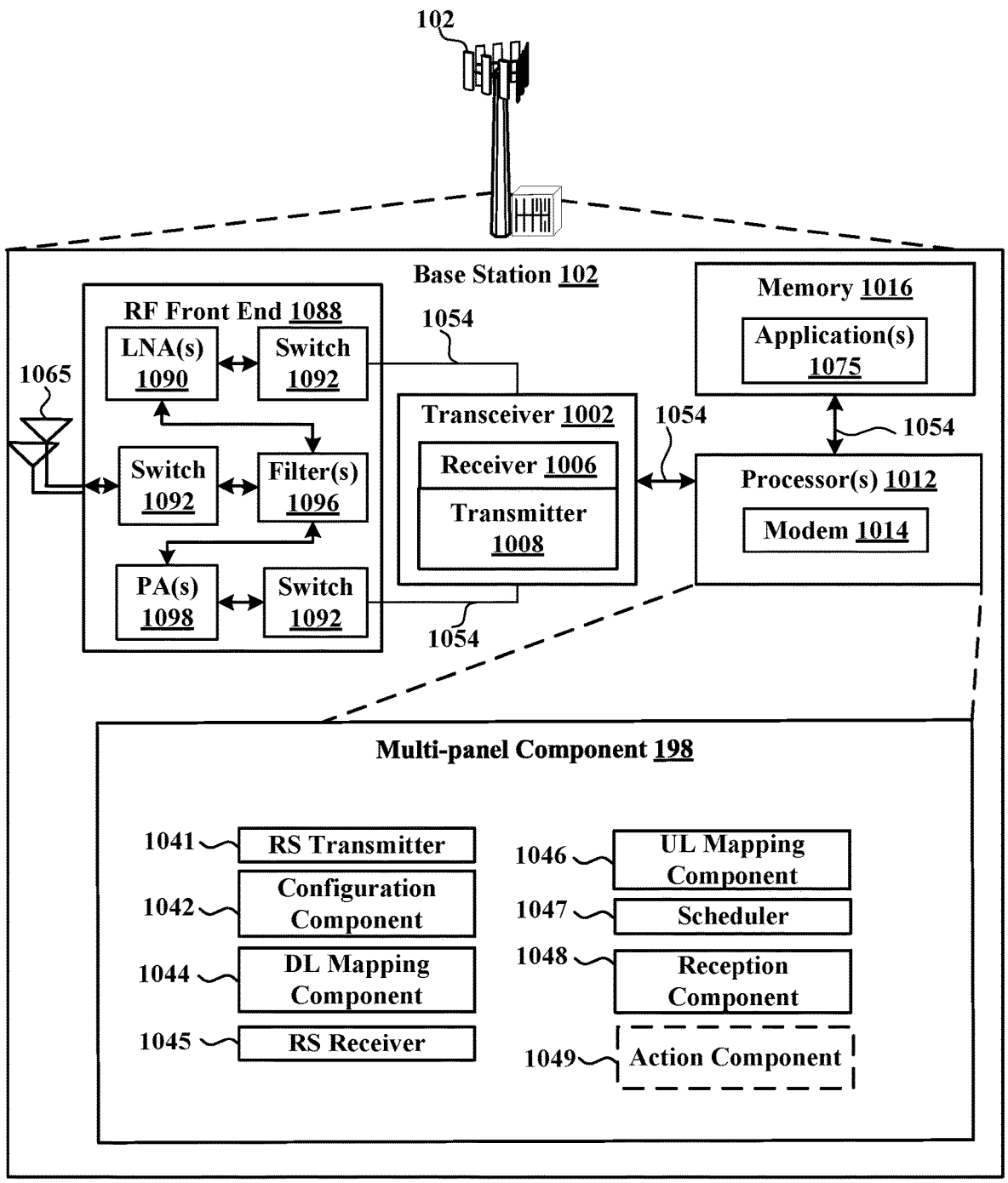
FIG. 10 is a schematic diagram of example components of the base station of FIG. 1.

A base station 102 in communication with the UE 104 may include a multi-panel component 198 that communicates with the panel control component 140 for activating and deactivating panels and performs signaling regarding the configuration and status of the panels. For example, as illustrated in FIG. 10, the multi-panel component 198 may include one or more of a RS transmitter 1041, a configuration component 1042, a DL mapping component 1044, a RS receiver 1045, an UL mapping component 1046, a scheduler 1047, and a reception component 1048. The multi-panel component 198 may optionally include an action component 1049. The RS transmitter 1041 may transmit, a downlink reference signal from a base station. The configuration component 1042 may transmit, to the UE, a configuration of an uplink reference signal resource. The DL mapping component 1044 may receive, from a UE having at least first panel and a second panel, a first report including a first mapping of downlink reference signals to panel identifiers. The RS receiver 1045 may receive, from the UE, an uplink reference signal. The UL mapping component 1046 may receive, from the UE, a second report including a second mapping between a panel identifier and the uplink reference signal. The scheduler 1047 may transmit an uplink grant indicating the panel using the panel identifier. The reception component 1048 may receive an uplink data channel transmitted from the UE using the panel. The optional action component 1049 may determine an action time when the second panel mapping is applicable. Further details of the multi-panel component 198 are described below.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
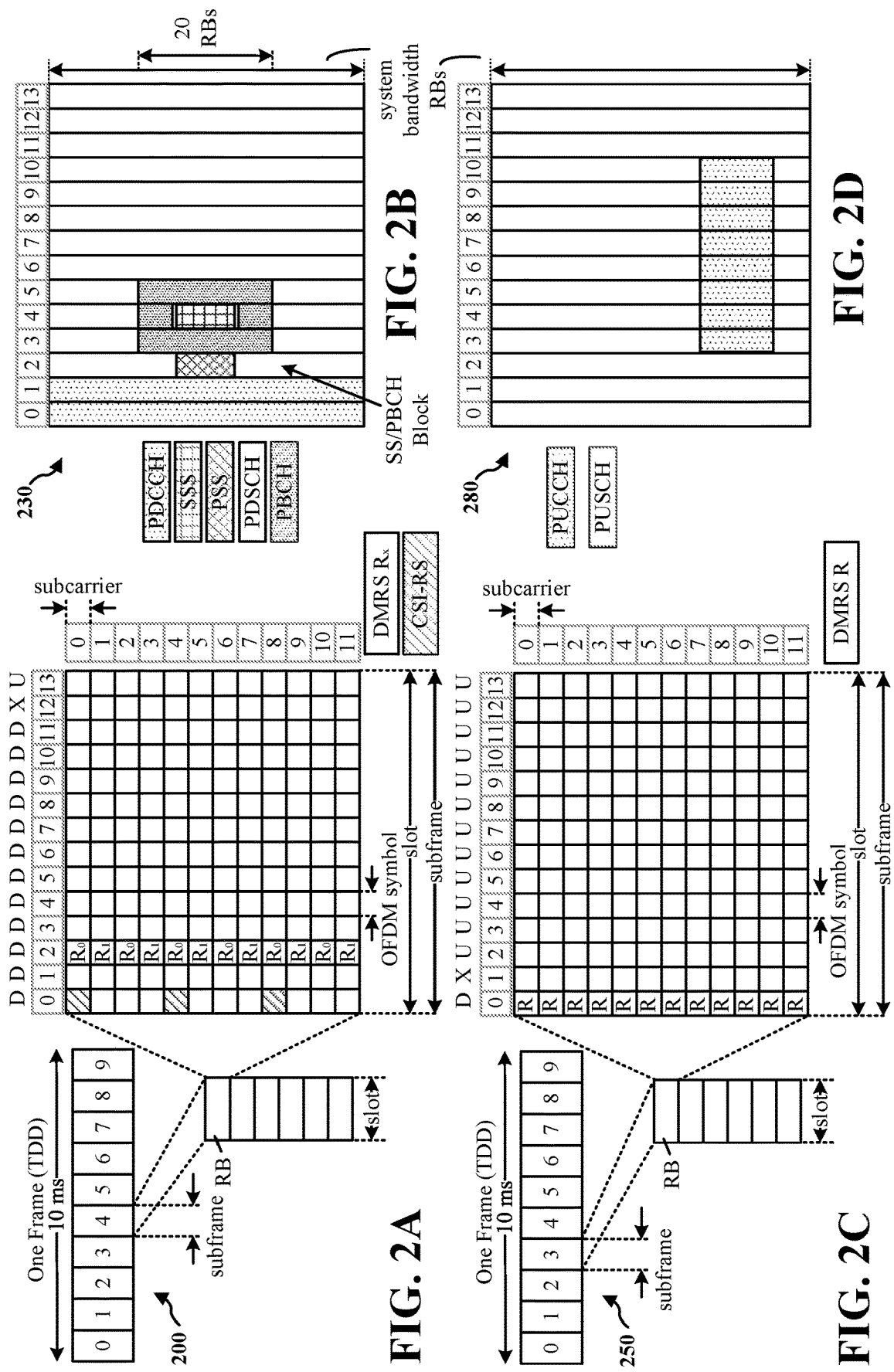
FIG. 2A is a diagram illustrating an example of a first 5G/NR frame.
FIG. 2B is a diagram illustrating an example of DL channels within a 5G/NR subframe.
FIG. 2C is a diagram illustrating an example of a second 5G/NR frame.
FIG. 2D is a diagram illustrating an example of a 5G/NR subframe.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
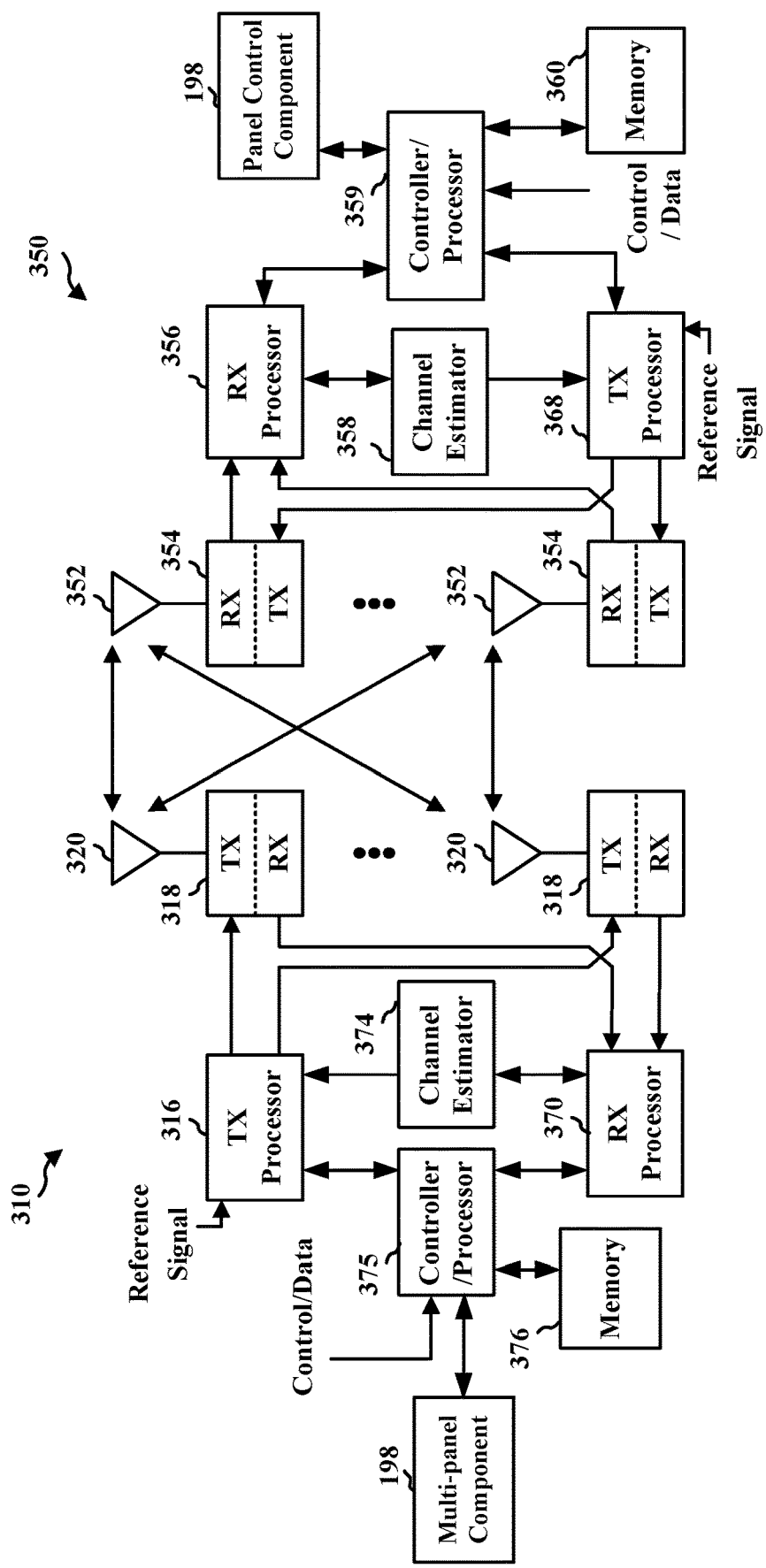
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting;

PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the panel control component 140 of FIG. 1.

At least one of the TX processor 316, the RX processor 370, and the controller/processor 375 may be configured to perform aspects in connection with the multi-panel component 198 of FIG. 1.

Figure 4:
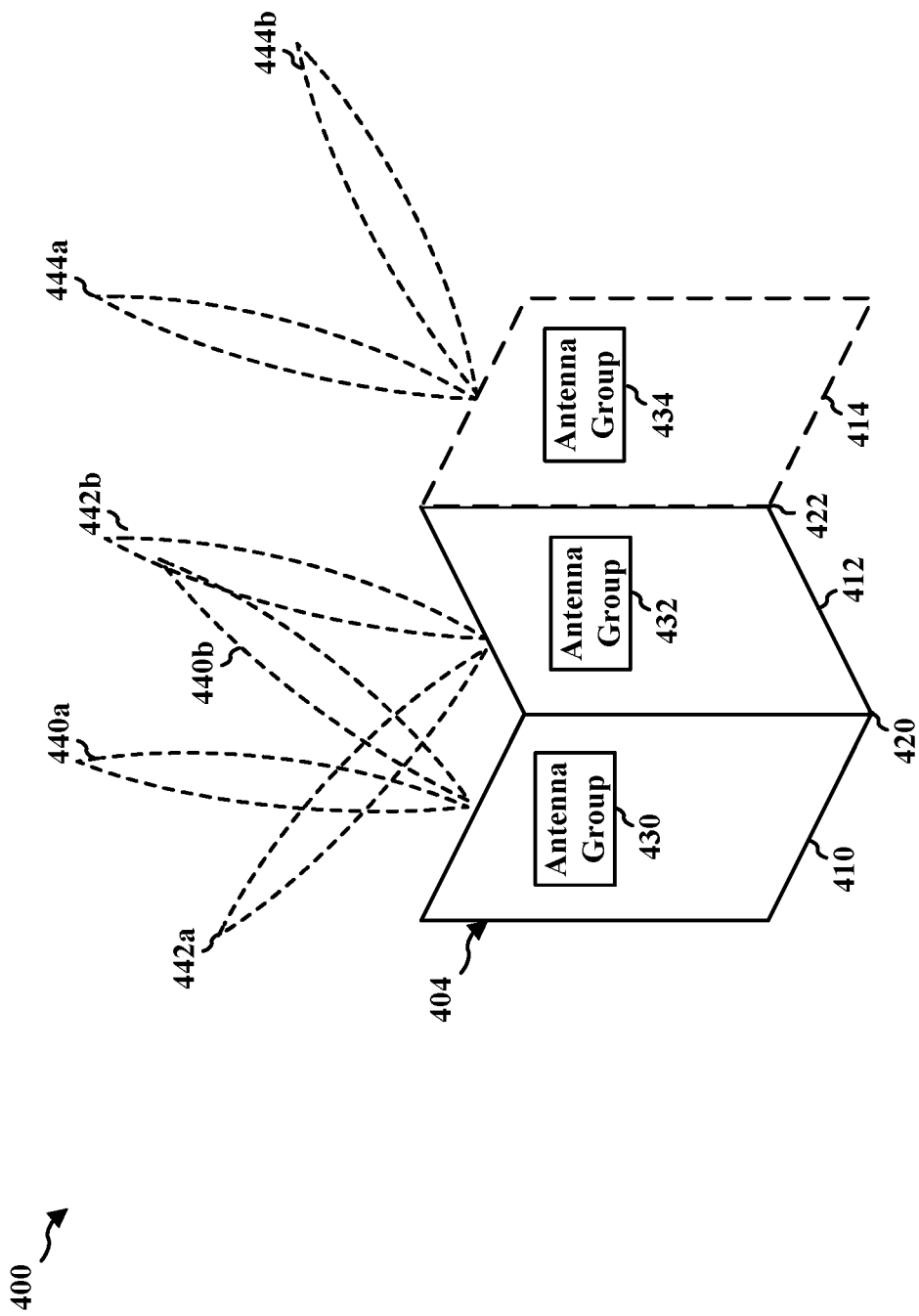
FIG. 4 is a conceptual diagram of a first example multi-panel UE.

Turning to FIG. 4 a conceptual diagram 400 includes an example multi-panel UE (MPUE) 404. The MPUE 404 may include multiple panels such as a first panel 410, a second panel 412, an optional third panel 414. The MPUE 404 may include additional optional panels (not shown). Generally, a panel may be a component of a UE including an antenna group including one or more antennas and associated with a panel ID. An antenna may include one or more antennas, antenna elements, and/or antenna arrays. Each panel may operate with a degree of independence. For example, each panel may be individually activated or deactivated. An activated panel may be used for transmission and/or reception. A deactivated panel may not be used for transmission and/or reception. For example, a deactivated panel may be in a sleep mode that saves power. In an aspect, a deactivated panel may be in a light sleep mode or a deep sleep mode. Each panel may be configured with a different panel identifier (panel ID). In an aspect, a panel may be associated with an antenna group. For example, the panel 410 may be associated with the antenna group 430, the panel 412 may be associated with the antenna group 432, and the panel 414 may be associated with the antenna group 434.

In an aspect, a panel may be a unit of an antenna group to control beams independently. For example, within a panel, one beam can be selected and used for UL transmission. For example, one of the beams 440a, 440b may be selected for panel 410. In an aspect, a UE may be limited to a single panel for UL transmission. In another aspect, multiple panels may be used for UL transmission and across different panels, multiple beams (each selected per panel) may be used for UL transmission. For example, one of the beams 442a, 442b may be selected for panel 412, and one of the beams 444a, 444b may be selected for panel 414. In another aspect, multiple beams may be transmitted from the same panel. For example, the panel 410 may transmit both of the beam 440a and the beam 440b. A limited number of beams is illustrated for simplicity, but it should be understood that a panel may select from a larger number of beams, for example, depending on a frequency range of the transmission.

In an aspect, a panel may be a unit of an antenna group to control transmission power for the antenna group. For example, all antennas or antenna elements within the antenna group may use the same transmission power.

In an aspect, a panel may be a unit of an antenna group having a common UL timing. For example, all antennas or antenna elements within the antenna group may be configured with the same timing advance.

In an aspect, the panels of the MPUE 404 may be based on a hardware structure of the MPUE 404. For example, the MPUE 404 may include a hinge 420 between the panel 410 and the panel 412 such that the panel 410 and panel 412 may be oriented at an angle with respect to each other. Similarly, a hinge 422 may be located between the panel 412 and the panel 414. In an aspect, the panels 410, 412, 414 may be physically reconfigured (e.g., by folding the MPUE 404 at a hinge 420, 422, to change the orientation of the panels. The direction of the beams associated with each panel may also change when the panels 410, 412, 414 are physically reconfigured.

Figure 5:
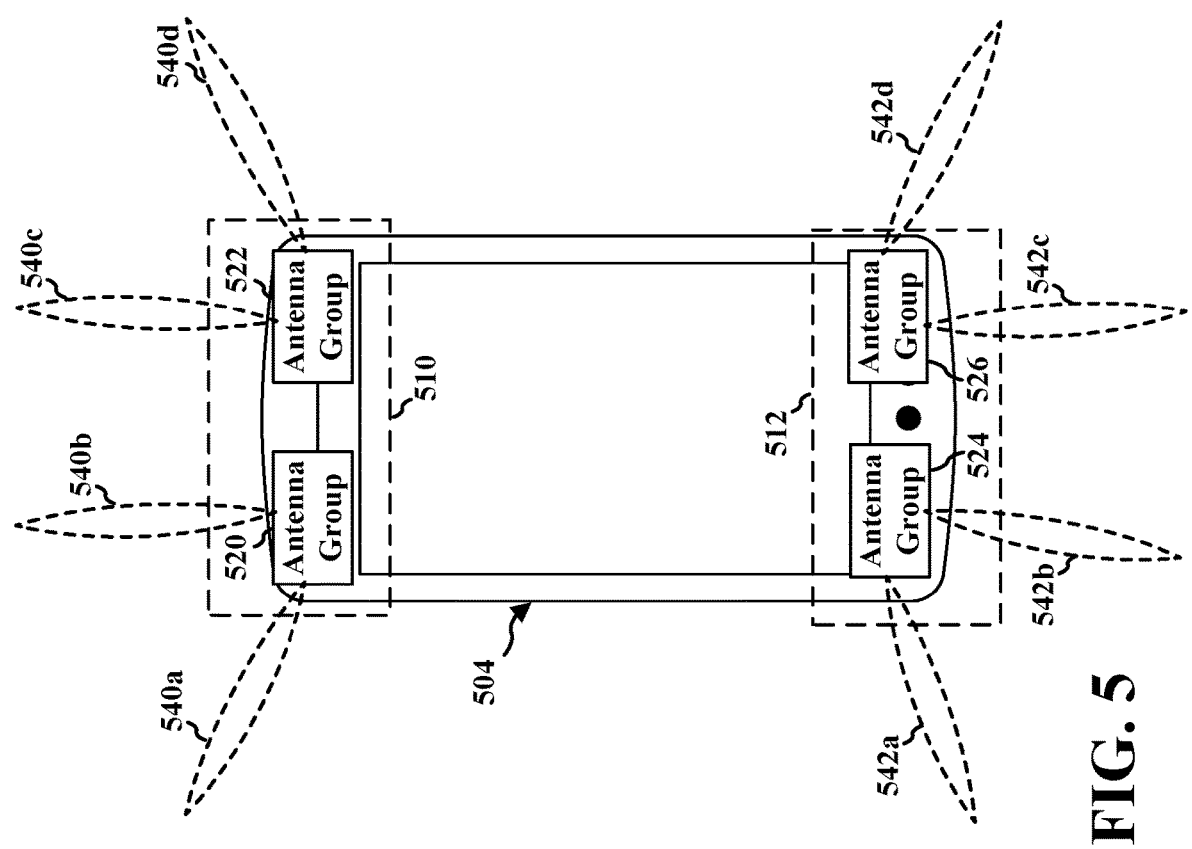
FIG. 5 is a conceptual diagram of a second example multi-panel UE.

In another aspect, the panels of the MPUE 404 may be dynamically defined, for example by selecting a subset of the total antennas or antenna elements as a panel. For example, FIG. 5 illustrates an example MPUE 504 that does not necessarily include hinges. The MPUE 504 may include multiple antenna groups 520, 522, 524, 526. The MPUE 504 may configure the antenna groups 520, 522, 524, 526 into multiple panels. For example, a first panel 510 may include antenna groups 520 and 522 and a second panel 512 may include antenna groups 524 and 526. When the first panel 510 is active, one of the beams 540a, 540b, 540c, 540d may be selected for uplink transmission. When the second panel 512 is active, one of the beams 542a, 542b, 542c, or 542d may be selected for uplink transmission. In an aspect, the MPUE 504 may dynamically configure panels including different combinations of the antenna groups 520, 522, 524, 526.

Figure 6:
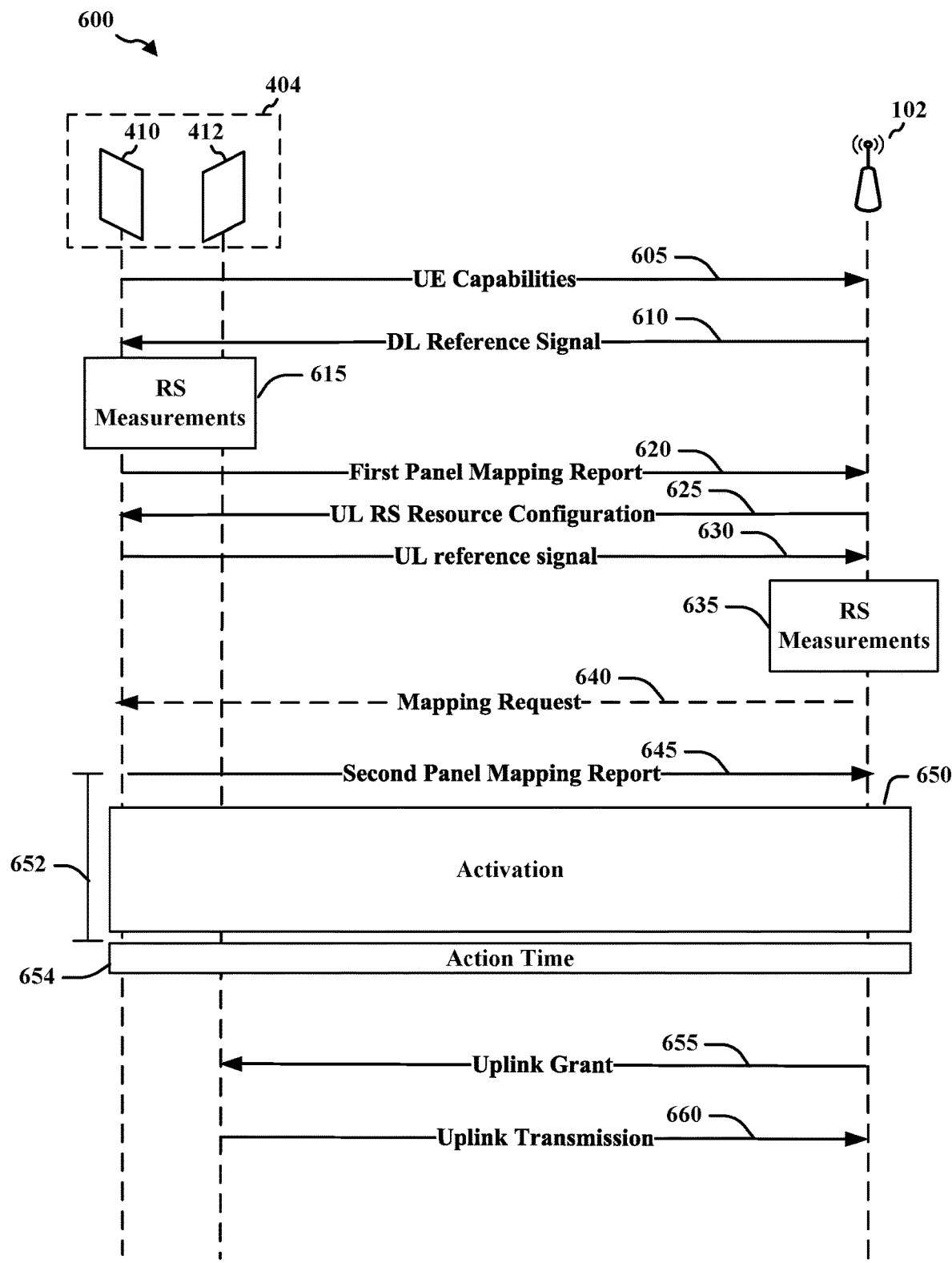
FIG. 6 is a message diagram showing example messages for configuring panel identifiers for a multi-panel UE.

Turning to FIG. 6, an example message diagram 600 includes signaling messages that may be used to identify one or more panels of an example MPUE 404 to use for a transmission.

The MPUE 404 may transmit UE capabilities 605, which may indicate that the MPUE 404 includes multiple panels. UE capabilities 605 may indicate a total number of panels of the MPUE 404 and/or a maximum number of active panels. The UE capabilities 605 may be carried in, for example, an RRC configuration message.

The base station 102 may transmit one or more downlink reference signals 610. The downlink reference signal 610 may use multiple DL beams. For example, the downlink reference signals 610 may include synchronization signal blocks (SSBs) and/or CSI-RS. The same reference signal may be transmitted on different beams and on different resources to allow the MPUE 404 to determine relative strengths of different beam and panel combinations.

At 615, the MPUE 404 may measure the multiple beams of the downlink reference signals 610. The MPUE 404 may determine a number (e.g., N) of strongest DL RSs. For example, the MPUE 404 may compare a signal strength such as a received signal strength indicator (RSSI), a reference signal received power (RSRP), or a signal to interference and noise ratio (SINR) for each of the received DL RSs corresponding to different beams to determine the number of strongest DL RSs. The MPUE 404 may rank the DL RSs to determine the top N strongest DL RSs. In an aspect, N may have a value between 1 and 8. In an aspect, with channel correspondence, the downlink beams may correspond to uplink beams.

The MPUE 404 may transmit a first panel mapping report 620 that includes one or more mappings between DL RSs, signal strengths, and panel identifiers. For example, the mapping report may include one or more mapping sets of a DL RS ID, corresponding RSRP/SINR, and corresponding UE Rx/Tx panel ID. For example, the MPUE 404 may transmit a mapping set for each of the top N strongest DL-RSs. Both MPUE 404 and base station 102 may store the mapping between each reported DL RS ID and corresponding UE Rx/Tx panel ID.

The base station 102 may transmit an uplink reference signal resource configuration 625. For example, the uplink reference signal resource configuration 625 may be an RRC message, a media access control (MAC) control element (CE) (MAC-CE), or a downlink control information (DCI). The MPUE 404 may transmit an UL reference signal 630 using the configured resources. For example, the uplink reference signal may include a sounding reference signal (SRS) for beam management, antenna switching, or codebook or non-codebook transmission. In an aspect, the UL reference signal 630 may not correspond to one of the DL reference signals. For example, the UL reference signal 630 may use a different beam, or may use a different panel than a downlink reference signal. For instance, the MPUE 404 may select a selected panel (e.g. a newly activated panel or a panel selected based on a signal strength of a corresponding downlink reference signal) for the UL reference signal. At 635, the base station 102 may perform reference signal measurements on the uplink reference signal 630. Similar to the measurements performed by the MPUE 404, the reference signal measurements may include at least one of RSSI, RSRP, or SINR.

The base station 102 may optionally transmit a mapping request 640. For example, the mapping request 640 may be transmitted based on the UL RS resource configuration 625 or the RS measurements 635. For instance, if the UL RS resource configuration 625 or the RS measurements 635 include a reference signal for which no panel ID is stored (e.g., when there is no beam correspondence between UL and DL), the base station 102 may transmit the mapping request 640. Accordingly, the base station 102 may transmit the mapping request 640 when the base station does not store a panel identifier corresponding to the selected panel.

The MPUE 404 may transmit a second panel mapping report 645 including a mapping of the UL reference signal 630 to a panel ID of the panel used to transmit the UL reference signal 630. For example, the second panel mapping report 645 may be based on the mapping request 640, or may be initiated by the MPUE 404, for example in response to transmitting using a new panel to transmit UL reference signal 630. The second panel mapping report 645 may be transmitted, for example, as a MAC-CE. The panel ID in the second panel mapping report 645 may be referred to as a selected panel identifier and may be consistent with a panel ID transmitted in the first panel mapping report 620. For example, if a panel ID included in the first mapping is the same as the selected panel ID included in the second mapping, the panel ID refers to a same physical panel or a same set of antennas. Accordingly, the first mapping and the second mapping may use the same panel identifier for the selected panel.

In an aspect, a panel mapping may be available at an action time 654. For example, the MPUE 404 and/or the base station 102 may need time (e.g., 1-5 ms) to configure for transmissions using the identified panel. The MPUE 404 and/or the base station 102 may perform activation 650. The MPUE 404 and/or the base station 102 may determine an action time 654 when the second panel mapping is available. In an aspect, the action time 654 may be based on a configured amount of time 652 after receipt of the downlink reference signal 610, the uplink reference signal 630, the second panel mapping report 645, or another signal sent by base station 102 in response to the second panel mapping report 645. In another aspect, the action time 654 may be signaled by the base station 102 or the MPUE 404. For example, the MPUE 404 may include the action time 654 in the second panel mapping report 645.

After the action time 654, the base station 102 may transmit an uplink grant 655 indicating a panel for transmission using the panel identifier. For example, the uplink grant 655 may be a DCI. The uplink grant 655 may include the panel identifier, which may be the selected panel identifier in the case where the base station selects the same panel used to transmit the uplink reference signal. In another aspect, the uplink grant 655 may indicate a downlink reference signal or an uplink reference signal associated with the selected panel identifier in the first panel mapping or the second panel mapping. The MPUE 404 may transmit an uplink transmission 660 (e.g., an uplink data channel) based on the uplink grant 655 using the indicated panel.

Figure 7:
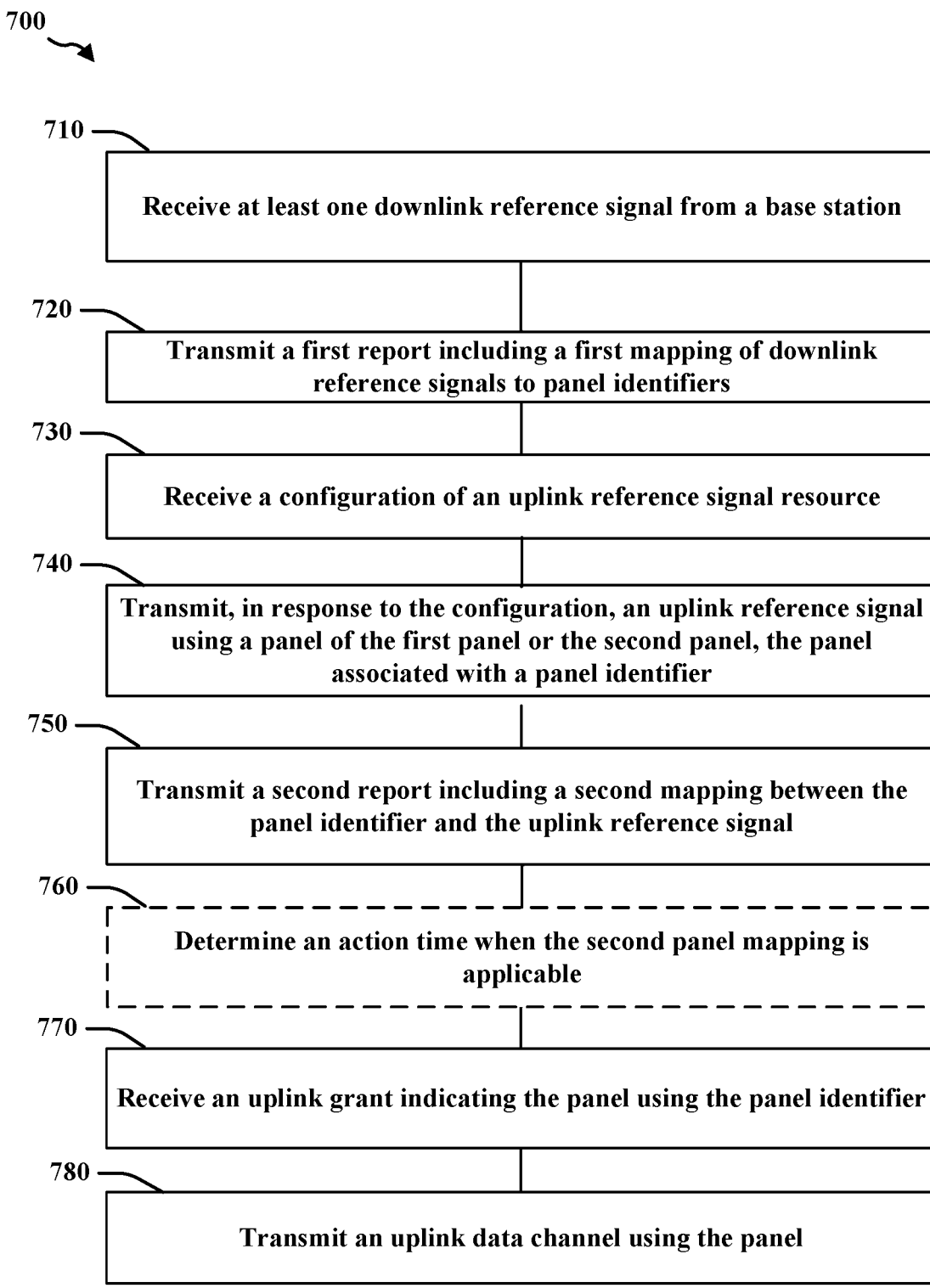
FIG. 7 is a flowchart of an example method for configuring panel identifiers for a multi-panel UE.

FIG. 7 is a flowchart of an example method 700 of wireless communication. The method 700 may be performed by a UE (e.g., the UE 104 including the panel control component 140 or the MPUE 404, 504, which may also include a panel control component 140. The UE performing the method 700 may include at least a first panel (e.g., panel 410) and a second panel (e.g., panel 412).

At 710, the method 700 may include receiving at least one downlink reference signal from a base station. In an aspect, for example, the UE 104, the RX processor 356, and/or the controller/processor 359 may execute the panel control component 140 and/or the RS receiver 141 to receive, at the MPUE 404 having at least first panel 410 and a second panel 412, the downlink reference signal 610 from the base station 102. Accordingly, the UE 104, the RX processor 356, and/or the controller/processor 359 executing the panel control component 140 and/or the RS receiver 141 may provide means for receiving at least one downlink reference signal from a base station.

At 720, the method 700 may include transmitting a first report including a first mapping of the at least one downlink reference signal to one or more panel identifiers. In an aspect, for example, the UE 104, the TX processor 368, and/or the controller/processor 359 may execute the panel control component 140 and/or the DL mapping component 144 to transmit the first panel mapping report 620 including the first mapping to the base station 102. For example, the DL mapping component 144 may determine a first mapping of each downlink reference signal 610 to a respective panel identifier. For instance, the first mapping may include mapping sets of a DL RS ID, corresponding RSRP/SINR, and corresponding UE Rx/Tx panel ID for each downlink reference signal 610. In an implementation, the first report may be transmitted as a MAC-CE. Accordingly, the UE 104, the TX processor 368, and/or the controller/processor 359 executing the panel control component 140 and/or the DL mapping component 144 may provide means for transmitting a first report including a first mapping of downlink reference signals to panel identifiers.

At 730, the method 700 may include receiving a configuration of an uplink reference signal resource. In an aspect, for example, the UE 104, the RX processor 356, and/or the controller/processor 359 may execute the panel control component 140 and/or the configuration component 142 to receive the UL RS resource configuration 625 of an uplink reference signal resource. Accordingly, the UE 104, the RX processor 356, and/or the controller/processor 359 executing the panel control component 140 and/or the configuration component 142 may provide means for receiving a configuration of an uplink reference signal resource.

At 740, the method 700 may include transmitting an uplink reference signal using a selected panel of the first panel or the second panel. The selected panel may be associated with a selected panel identifier. In an aspect, for example, the UE 104, the TX processor 368, and/or the controller/processor 359 may execute the panel control component 140 and/or the RS transmitter 145 to transmit the uplink reference signal 630 using the selected panel of the first panel 410 or the second panel 412, the selected panel associated with the selected panel identifier. The uplink reference signal may be a SRS for beam management, antenna switching, or codebook or non-codebook transmission. Accordingly, the UE 104, the TX processor 368, and/or the controller/processor 359 executing the panel control component 140 and/or the RS transmitter 145 may provide means for transmitting an uplink reference signal using a selected panel of the first panel or the second panel.

At 750, the method 700 may include transmitting a second report including a second mapping between the selected panel identifier and the uplink reference signal. In an aspect, for example, the UE 104, the TX processor 368, and/or the controller/processor 359 may execute the panel control component 140 and/or the UL mapping component 146 to transmit the second panel mapping report 645 including the second mapping between the selected panel identifier and the uplink reference signal. In an aspect, the second report may be a MAC-CE. In an aspect, a panel ID included in the first mapping is the same as a panel ID included in the second mapping and the panel ID refers to a same physical panel. Accordingly, the UE 104, the TX processor 368, and/or the controller/processor 359 executing the panel control component 140 and/or the UL mapping component 146 may provide means for transmitting a second report including a second mapping between the selected panel identifier and the uplink reference signal.

At 760, the method 700 may optionally include determining an action time when the second panel mapping is applicable. In an aspect, for example, the UE 104, the RX processor 356, and/or the controller/processor 359 may execute the panel control component 140 and/or the action component 149 to determine an action time when the second panel mapping is applicable. In an implementation, action time may be based on a configured amount of time (e.g., an activation time 652) after: receipt of a downlink reference signal 610; receipt of a confirmation signaling sent by the base station in response to a receipt of the first report 620 or the second report 645; transmission of the uplink reference signal 630; transmission of the second report 645; or some combination thereof. In another implementation, the action time is identified by the base station. In yet another implementation, the action component 149 may transmit the action time to the base station 102. Accordingly, the UE 104, the RX processor 356, and/or the controller/processor 359 executing the panel control component 140 and/or the action component 149 may provide means for determining an action time when the second panel mapping is applicable.

At 770, the method 700 may include receiving an uplink grant indicating the panel using the panel identifier. In an aspect, for example, the UE 104, the RX processor 356, and/or the controller/processor 359 may execute the panel control component 140 and/or the grant component 147 to receive the uplink grant 655 indicating the selected panel associated with the selected panel identifier. In an implementation, the uplink grant indicates a downlink reference signal or an uplink reference signal associated with the selected panel identifier in the first panel mapping or the second panel mapping. Accordingly, the UE 104, the RX processor 356, and/or the controller/processor 359 executing the panel control component 140 and/or the grant component 147 may provide means for receiving an uplink grant indicating the selected panel associated with the selected panel identifier.

At 780, the method 700 may include transmitting an uplink data channel using the selected panel. In an aspect, for example, the UE 104, the TX processor 368, and/or the controller/processor 359 may execute the panel control component 140 and/or the transmission component 148 to transmit an uplink data channel (e.g., uplink transmission 660) using the selected panel. Accordingly, the UE 104, the TX processor 368, and/or the controller/processor 359 executing the panel control component 140 and/or the transmission component 148 may provide means for transmitting an uplink data channel using the selected panel.

Figure 8:
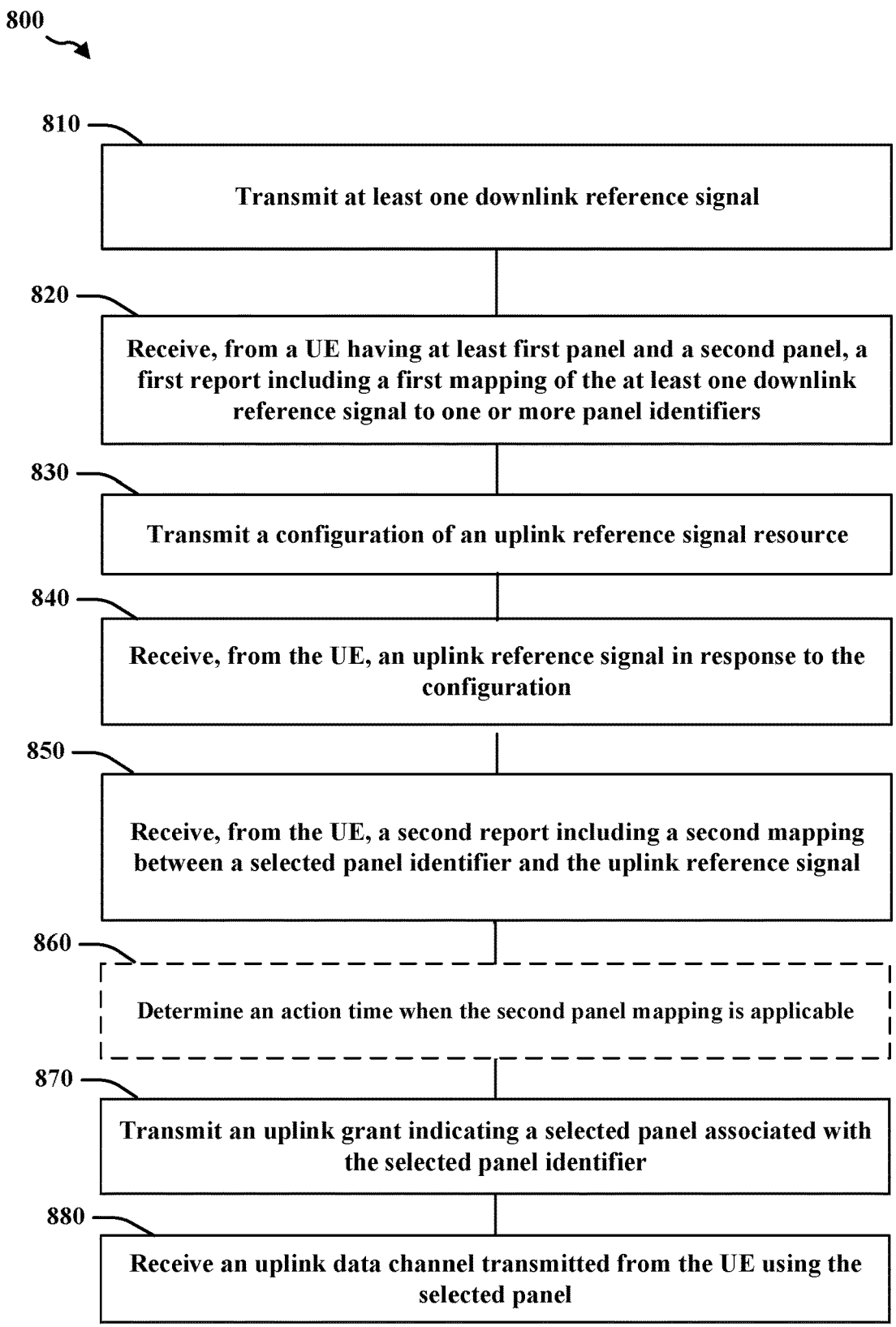
FIG. 8 is a flowchart of an example method for configuring panel identifiers for a base station in communication with a multi-panel UE.

FIG. 8 is a flowchart of an example method 800 of wireless communication. The method 800 may be performed by a base station (e.g., the base station 102 including the multi-panel component 198). The method 800 may be performed in communication with an MPUE 404 including a plurality of panels such as at least a first panel (e.g., panel 410) and a second panel (e.g., panel 412). Dashed lines indicate an optional block.

At 810, the method 800 may include transmitting, at least one downlink reference signal. In an aspect, for example, the base station 102, the controller/processor 375, and/or the TX processor 316 may execute the multi-panel component 198 and/or the RS transmitter 1041 to transmit, at least the downlink reference signal 610. Accordingly, the UE 104, the RX processor 356, and/or the controller/processor 359 executing the panel control component 140 and/or the RS transmitter 1041 may provide means for transmitting, at least one downlink reference signal.

At 820, the method 800 may include receiving, from a UE having at least first panel and a second panel, a first report including a first mapping of the at least one downlink reference signal to one or more panel identifiers. In an aspect, for example, the base station 102, the controller/processor 375, and/or the RX processor 370 may execute the multi-panel component 198 and/or the DL mapping component 1044 to receive, from a UE 104 having at least first panel 410 and a second panel 412, a first report 620 including a first mapping of at least the downlink reference signal 610 to one or more panel identifiers. The first report may be received as a MAC-CE. Accordingly, the base station 102, the controller/processor 375, and/or the RX processor 370 executing the multi-panel component 198 and/or the DL mapping component 1044 may provide means for receiving, from a UE having at least first panel and a second panel, a first report including a first mapping of the at least one downlink reference signal to one or more panel identifiers.

At 830, the method 800 may include transmitting a configuration of an uplink reference signal resource. In an aspect, for example, the base station 102, the controller/processor 375, and/or the TX processor 316 may execute the multi-panel component 198 and/or the configuration component 1042 to transmit a configuration 625 of an uplink reference signal resource. Accordingly, the UE 104, the RX processor 356, and/or the controller/processor 359 executing the panel control component 140 and/or the configuration component 1042 may provide means for transmitting a configuration of an uplink reference signal resource.

At 840, the method 800 may include receiving, from the UE, an uplink reference signal in response to the configuration. The panel may be associated with a panel identifier. In an aspect, for example, the base station 102, the controller/processor 375, and/or the RX processor 370 may execute the multi-panel component 198 and/or the RS receiver 1045 to receive, from the UE 104, an uplink reference signal 630 in response to the configuration 625. The uplink reference signal may be a sounding reference signal for beam management, antenna switching, codebook or non-codebook transmission, or some combination thereof. Accordingly, the base station 102, the controller/processor 375, and/or the RX processor 370 executing the multi-panel component 198 and/or the RS receiver 1045 may provide means for receiving, from the UE, an uplink reference signal in response to the configuration.

At 850, the method 800 may include receiving, from the UE, a second report including a second mapping between a selected panel identifier and the uplink reference signal. In an aspect, for example, the base station 102, the controller/processor 375, and/or the RX processor 370 may execute the multi-panel component 198 and/or the UL mapping component 1046 to receive, from the UE 104, a second report 645 including a second mapping between a selected panel identifier and the uplink reference signal 630. In an aspect, the second report 645 may be a MAC-CE. In an aspect, a panel ID included in the first mapping is the same as a panel ID included in the second mapping, and the panel ID refers to a same physical panel. Accordingly, the base station 102, the controller/processor 375, and/or the RX processor 370 executing the multi-panel component 198 and/or the UL mapping component 1046 may provide means for receiving, from the UE, a second report including a second mapping between a selected panel identifier and the uplink reference signal.

At 860, the method 800 may optionally include determining an action time when the second panel mapping is applicable. In an aspect, for example, the base station 102, the controller/processor 375, and/or the RX processor 370 may execute the multi-panel component 198 and/or the action component 1049 to determine an action time when the second panel mapping is applicable. In an implementation, action time may be based, at least in part, on a configured amount of time after: transmission of a downlink reference signal 610; receipt of the uplink reference signal 630; receipt of the second report 645; transmission of confirmation signaling sent by the base station in response to a receipt of the first report 620 or the second report 645; or some combination thereof. In another implementation, the action time is identified by the base station. In yet another implementation, the action component 149 may receive the action time from the UE 104. Accordingly, the base station 102, the controller/processor 375, and/or the RX processor 370 executing the multi-panel component 198 and/or the action component 1049 may provide means for determining an action time when the second panel mapping is applicable.

At 870, the method 800 may include transmitting an uplink grant indicating the selected panel associated with the selected panel identifier. In an aspect, for example, the base station 102, the controller/processor 375, and/or the TX processor 316 may execute the multi-panel component 198 and/or the scheduler 1047 to transmit an uplink grant indicating the selected panel associated with the selected panel identifier. In an implementation, the uplink grant indicates a downlink reference signal or an uplink reference signal associated with the selected panel identifier in the first panel mapping or the second panel mapping. Accordingly, the UE 104, the RX processor 356, and/or the controller/processor 359 executing the panel control component 140 and/or the scheduler 1047 may provide means for transmitting an uplink grant indicating the selected panel associated with the selected panel identifier.

At 880, the method 800 may include receiving an uplink data channel transmitted from the UE using the selected panel. In an aspect, for example, the base station 102, the controller/processor 375, and/or the RX processor 370 may execute the multi-panel component 198 and/or the reception component 1048 to receive an uplink data channel transmitted from the UE using the selected panel. Accordingly, the base station 102, the controller/processor 375, and/or the RX processor 370 executing the multi-panel component 198 and/or the reception component 1048 may provide means for receiving an uplink data channel transmitted from the UE using the selected panel.

Figure 9:
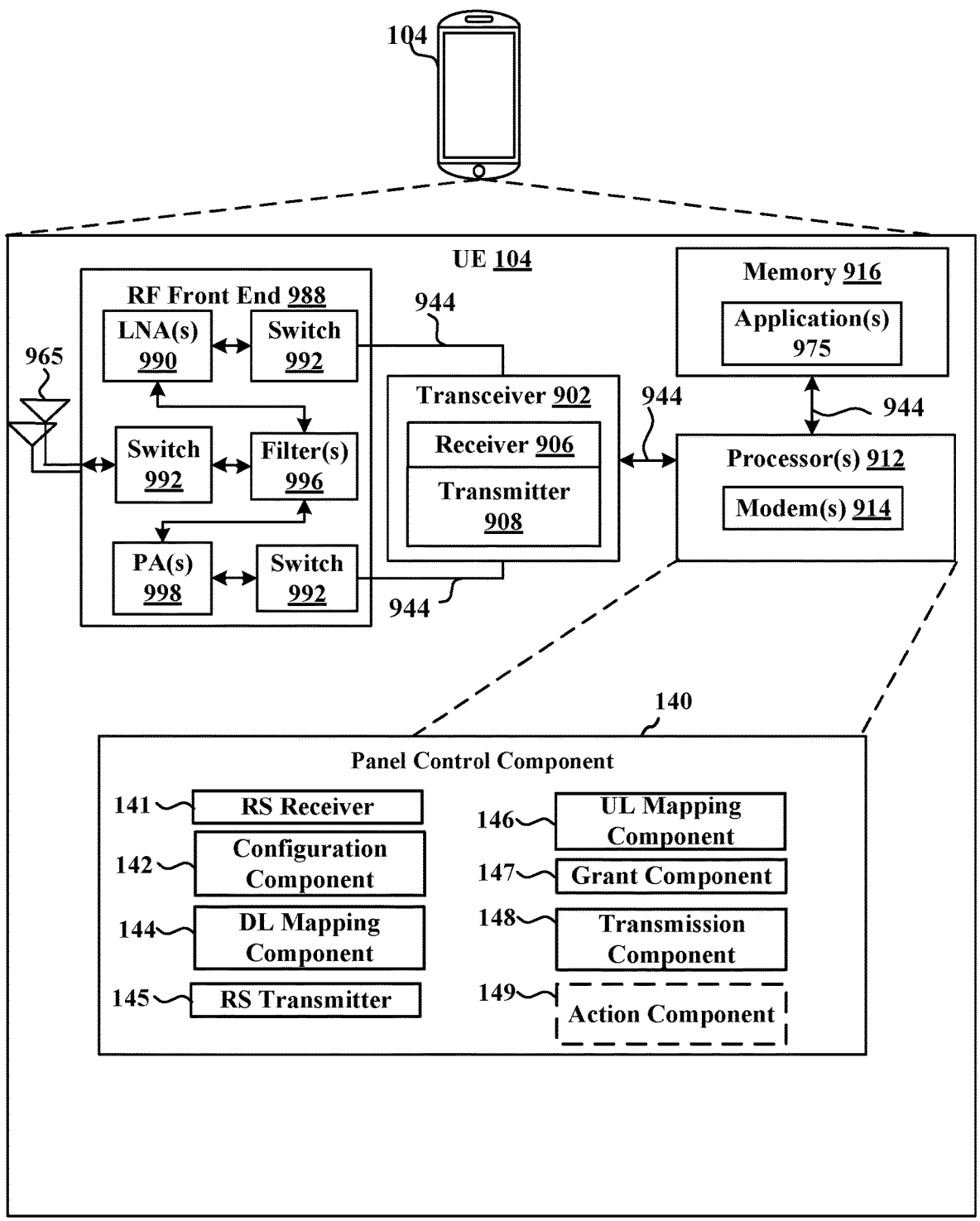
FIG. 9 is a schematic diagram of example components of the UE of FIG. 1.

Referring to FIG. 9, one example of an implementation of UE 104 may include a variety of components, some of which have already been described above, but including components such as one or more processors 912 and memory 916 and transceiver 902 in communication via one or more buses 944, which may operate in conjunction with modem 914 and panel control component 140 to enable one or more of the functions described herein related to signaling for panel activation. Further, the one or more processors 912, modem 914, memory 916, transceiver 902, RF front end 988 and one or more antennas 965, may be configured to support voice and/or data calls (simultaneously or non-simultaneously) in one or more radio access technologies. The antennas 965 may include one or more antennas, antenna elements, and/or antenna arrays.

In an aspect, the one or more processors 912 can include a modem 914 that uses one or more modem processors. The various functions related to panel control component 140 may be included in modem 914 and/or processors 912 and, in an aspect, can be executed by a single processor, while in other aspects, different ones of the functions may be executed by a combination of two or more different processors. For example, in an aspect, the one or more processors 912 may include any one or any combination of a modem processor, or a baseband processor, or a digital signal processor, or a transmit processor, or a receiver processor, or a transceiver processor associated with transceiver 902. In other aspects, some of the features of the one or more processors 912 and/or modem 914 associated with panel control component 140 may be performed by transceiver 902.

Also, memory 916 may be configured to store data used herein and/or local versions of applications 975 or panel control component 140 and/or one or more of the subcomponents thereof being executed by at least one processor 912. Memory 916 can include any type of computer-readable medium usable by a computer or at least one processor 912, such as random access memory (RAM), read only memory (ROM), tapes, magnetic discs, optical discs, volatile memory, non-volatile memory, and any combination thereof. In an aspect, for example, memory 916 may be a non-transitory computer-readable storage medium that stores one or more computer-executable codes defining panel control component 140 and/or one or more of the subcomponents thereof, and/or data associated therewith, when UE 104 is operating at least one processor 912 to execute panel control component 140 and/or one or more of the subcomponents thereof.

Transceiver 902 may include at least one receiver 906 and at least one transmitter 908. Receiver 906 may include hardware, firmware, and/or software code executable by a processor for receiving data, the code comprising instructions and being stored in a memory (e.g., computer-readable medium). Receiver 906 may be, for example, a radio frequency (RF) receiver. In an aspect, receiver 906 may receive signals transmitted by at least one base station 102. Additionally, receiver 906 may process such received signals, and also may obtain measurements of the signals, such as, but not limited to, Ec/Io, SNR, RSRP, RSSI, etc. Transmitter 908 may include hardware, firmware, and/or software code executable by a processor for transmitting data, the code comprising instructions and being stored in a memory (e.g., computer-readable medium). A suitable example of transmitter 908 may including, but is not limited to, an RF transmitter.

Moreover, in an aspect, UE 104 may include RF front end 988, which may operate in communication with one or more antennas 965 and transceiver 902 for receiving and transmitting radio transmissions, for example, wireless communications transmitted by at least one base station 102 or wireless transmissions transmitted by UE 104. RF front end 988 may be connected to one or more antennas 965 and can include one or more low-noise amplifiers (LNAs) 990, one or more switches 992, one or more power amplifiers (PAs) 998, and one or more filters 996 for transmitting and receiving RF signals.

In an aspect, LNA 990 can amplify a received signal at a desired output level. In an aspect, each LNA 990 may have a specified minimum and maximum gain values. In an aspect, RF front end 988 may use one or more switches 992 to select a particular LNA 990 and a corresponding specified gain value based on a desired gain value for a particular application.

Further, for example, one or more PA(s) 998 may be used by RF front end 988 to amplify a signal for an RF output at a desired output power level. In an aspect, each PA 998 may have specified minimum and maximum gain values. In an aspect, RF front end 988 may use one or more switches 992 to select a particular PA 998 and a corresponding specified gain value based on a desired gain value for a particular application.

Also, for example, one or more filters 996 can be used by RF front end 988 to filter a received signal to obtain an input RF signal. Similarly, in an aspect, for example, a respective filter 996 can be used to filter an output from a respective PA 998 to produce an output signal for transmission. In an aspect, each filter 996 can be connected to a specific LNA 990 and/or PA 998. In an aspect, RF front end 988 can use one or more switches 992 to select a transmit or receive path using a specified filter 996, LNA 990, and/or PA 998, based on a configuration as specified by transceiver 902 and/or processor 912.

As such, transceiver 902 may be configured to transmit and receive wireless signals through one or more antennas 965 via RF front end 988. In an aspect, transceiver may be tuned to operate at specified frequencies such that UE 104 can communicate with, for example, one or more base stations 102 or one or more cells associated with one or more base stations 102. In an aspect, for example, modem 914 can configure transceiver 902 to operate at a specified frequency and power level based on the UE configuration of the UE 104 and the communication protocol used by modem 914.

In an aspect, modem 914 can be a multiband-multimode modem, which can process digital data and communicate with transceiver 902 such that the digital data is sent and received using transceiver 902. In an aspect, modem 914 can be multiband and be configured to support multiple frequency bands for a specific communications protocol. In an aspect, modem 914 can be multimode and be configured to support multiple operating networks and communications protocols. In an aspect, modem 914 can control one or more components of UE 104 (e.g., RF front end 988, transceiver 902) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Referring to FIG. 10, one example of an implementation of base station 102 may include a variety of components, some of which have already been described above, but including components such as one or more processors 1012 and memory 1016 and transceiver 1002 in communication via one or more buses 1054, which may operate in conjunction with modem 1014 and multi-panel component 198 to enable one or more of the functions described herein related to signaling panel activation.

The transceiver 1002, receiver 1006, transmitter 1008, one or more processors 1012, memory 1016, applications 1075, buses 1054, RF front end 1088, LNAs 1090, switches 1092, filters 1096, PAs 1098, and one or more antennas 1065 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Some Further Example Embodiments

A first example method of wireless communication, comprising, by a user equipment (UE) having at least a first panel and a second panel: receiving at least one downlink reference signal from a base station; transmitting a first report including a first mapping of the at least one downlink reference signal to one or more panel identifiers; receiving a configuration of an uplink reference signal resource; transmitting, in response to the configuration, an uplink reference signal using a selected panel of the first panel or the second panel, the selected panel being associated with a selected panel identifier; transmitting a second report including a second mapping between the selected panel identifier and the uplink reference signal; receiving an uplink grant indicating the selected panel associated with the selected panel identifier; and transmitting an uplink data channel using the selected panel.

The above first example method, further comprising, by the UE, determining an action time when the second mapping is applicable.

Any of the above first example methods, wherein the action time is based, at least in part, on a configured amount of time after: receipt of a downlink reference signal; receipt of a confirmation signaling sent by the base station in response to a receipt of the first report or the second report; transmission of the uplink reference signal; transmission of the second report; or some combination thereof.

Any of the above first example methods, wherein the action time is identified by the base station.

Any of the above first example methods, further comprising, by the UE, transmitting the action time to the base station.

Any of the above first example methods, wherein the uplink grant indicates a downlink reference signal or an uplink reference signal associated with the selected panel identifier in the first mapping or the second mapping.

Any of the above first example methods, wherein the transmitting the second report including the second mapping comprises transmitting a media access control (MAC) control element (CE).

Any of the above first example methods, wherein a panel identifier included in the first mapping is the same as a panel identifier included in the second mapping and the panel identifier is associated with a same physical panel.

Any of the above first example methods, wherein the uplink reference signal includes a sounding reference signal for beam management, antenna switching, or codebook or non-codebook transmission, or some combination thereof.

An UE, comprising: a plurality of panels, including at least a first panel and a second panel; a transceiver coupled to the plurality of panels; a memory; and at least one processor coupled with the transceiver and the memory and configured to perform any of the above first example methods.

An apparatus for wireless communication, comprising: means for performing any of the above first example methods.

A non-transitory computer-readable medium storing computer executable code, the code when executed by a processor cause the processor to perform any of the above first example methods.

A second example method of wireless communication, comprising, at a base station: transmitting at least one downlink reference signal; receiving, from a user equipment (UE) having at least first panel and a second panel, a first report including a first mapping of the at least one downlink reference signal to one or more panel identifiers; transmitting a configuration of an uplink reference signal resource; receiving, from the UE, an uplink reference signal in response to the configuration; receiving, from the UE, a second report including a second mapping between a selected panel identifier and the uplink reference signal; transmitting an uplink grant indicating a selected panel associated with the selected panel identifier; and receiving an uplink data channel transmitted from the UE using the selected panel.

The above second example method, further comprising, at the base station, determining an action time when the second mapping is applicable.

Any of the above second example methods, wherein the action time is based, at least in part, on a configured amount of time after: transmission of a downlink reference signal; receipt of the uplink reference signal; receipt of the second report; transmission of confirmation signaling sent by the base station in response to a receipt of the first report or the second report; or some combination thereof.

Any of the above second example methods, further comprising, at the base station, signaling the action time to the UE.

Any of the above second example methods, further comprising, at the base station, receiving the action time from the UE.

Any of the above second example methods, wherein the uplink grant indicates a downlink reference signal or an uplink reference signal associated with the selected panel identifier in the first mapping or the second mapping.

Any of the above second example methods, wherein receiving, from the UE, the second report including the second mapping comprises receiving a media access control (MAC) control element (CE).

Any of the above second example methods, wherein a panel identifier included in the first mapping is the same as a panel identifier included in the second mapping and the panel identifier refers to a same physical panel.

Any of the above second example methods, wherein the uplink reference signal includes a sounding reference signal for beam management, antenna switching, codebook or non-codebook transmission, or some combination thereof.

An apparatus for wireless communication, comprising: a transceiver, a memory; and at least one processor coupled with the transceiver and the memory and configured to perform any of the above second example methods.

An apparatus for wireless communication, comprising: means for performing any of the above second example methods.

A non-transitory computer-readable medium storing computer executable code, the code when executed by a processor cause the processor to perform any of the above second example methods.

What is claimed is:

1. A method of wireless communication, comprising, by a user equipment (UE) having at least a first panel and a second panel:
  receiving at least one downlink reference signal from a base station;
  transmitting a first report including a first mapping of the at least one downlink reference signal to one or more panel identifiers;
  receiving a configuration of an uplink reference signal resource;
  transmitting, in response to the configuration, an uplink reference signal using a selected panel of the first panel or the second panel, the selected panel being associated with a selected panel identifier;
  transmitting a second report including a second mapping between the selected panel identifier and the uplink reference signal;
  receiving an uplink grant indicating the selected panel associated with the selected panel identifier; and
  transmitting an uplink data channel using the selected panel.

2. The method of claim 1, further comprising, by the UE, determining an action time when the second mapping is applicable.

3. The method of claim 2, wherein the action time is based, at least in part, on a configured amount of time after: receipt of a downlink reference signal; receipt of a confirmation signaling sent by the base station in response to a receipt of the first report or the second report; transmission of the uplink reference signal; transmission of the second report; or some combination thereof.

4. The method of claim 2, wherein the action time is identified by the base station.

5. The method of claim 2, further comprising, by the UE, transmitting the action time to the base station.

6. The method of claim 1, wherein the uplink grant indicates a downlink reference signal or an uplink reference signal associated with the selected panel identifier in the first mapping or the second mapping.

7. The method of claim 1, wherein the transmitting the second report including the second mapping comprises transmitting a media access control (MAC) control element (CE).

8. The method of claim 1, wherein a panel identifier included in the first mapping is the same as a panel identifier included in the second mapping and the panel identifier is associated with a same physical panel.

9. The method of claim 1, wherein the uplink reference signal includes a sounding reference signal for beam management, antenna switching, or codebook or non-codebook transmission, or some combination thereof.

10. A method of wireless communication, comprising, at a base station:
transmitting at least one downlink reference signal;
receiving, from a user equipment (UE) having at least first panel and a second panel, a first report including a first mapping of the at least one downlink reference signal to one or more panel identifiers;
transmitting a configuration of an uplink reference signal resource;
receiving, from the UE, an uplink reference signal in response to the configuration;
receiving, from the UE, a second report including a second mapping between a selected panel identifier and the uplink reference signal;
transmitting an uplink grant indicating a selected panel associated with the selected panel identifier; and
receiving an uplink data channel transmitted from the UE using the selected panel.

11. The method of claim 10, further comprising, at the base station, determining an action time when the second mapping is applicable.

12. The method of claim 11, wherein the action time is based, at least in part, on a configured amount of time after: transmission of a downlink reference signal; receipt of the uplink reference signal; receipt of the second report; transmission of confirmation signaling sent by the base station in response to a receipt of the first report or the second report; or some combination thereof.

13. The method of claim 11, further comprising, at the base station, signaling the action time to the UE.

14. The method of claim 11, further comprising, at the base station, receiving the action time from the UE.

15. The method of claim 11, wherein the uplink grant indicates a downlink reference signal or an uplink reference signal associated with the selected panel identifier in the first mapping or the second mapping.

16. The method of claim 10, wherein receiving, from the UE, the second report including the second mapping comprises receiving a media access control (MAC) control element (CE).

17. The method of claim 10, wherein a panel identifier included in the first mapping is the same as a panel identifier included in the second mapping and the panel identifier is associated with a same physical panel.

18. The method of claim 10, wherein the uplink reference signal includes a sounding reference signal for beam management, antenna switching, codebook or non-codebook transmission, or some combination thereof.

19. A user equipment (UE) comprising:
a plurality of panels, including at least a first panel and a second panel;
a transceiver coupled to the plurality of panels;
a memory; and
at least one processor coupled with the transceiver and the memory and configured to:
receive, via the transceiver, at least one downlink reference signal from a base station;
initiate transmission, via the transceiver, of a first report including a first mapping of the at least one downlink reference signal to one or more panel identifiers;
receive, via the transceiver, a configuration of an uplink reference signal resource;
initiate transmission, via the transceiver, in response to the configuration, of an uplink reference signal using a selected panel of the first panel or the second panel, the selected panel being associated with a selected panel identifier;
initiate transmission, via the transceiver, of a second report including a second mapping between the selected panel identifier and the uplink reference signal;
receive, via the transceiver, an uplink grant indicating the selected panel associated with the selected panel identifier; and
initiate transmission, via the transceiver, of an uplink data channel using the selected panel.

20. The UE of claim 19, wherein the at least one processor is further configured to determine an action time when the second mapping is applicable.

21. The UE of claim 20, wherein the action time is based, at least in part, on a configured amount of time after: receipt of a downlink reference signal; receipt of a confirmation signaling sent by the base station in response to a receipt of the first report or the second report; transmission of the uplink reference signal; transmission of the second report; or some combination thereof.

22. The UE of claim 20, wherein the action time is identified by the base station.

23. The UE of claim 20, wherein the at least one processor is further configured to transmit the action time to the base station.

24. The UE of claim 19, wherein the uplink grant indicates a downlink reference signal or an uplink reference signal associated with the selected panel identifier in the first mapping or the second mapping.

25. The UE of claim 19, wherein the at least one processor is configured to transmit the second report including the second mapping as a media access control (MAC) control element (CE).

26. The UE of claim 19, wherein a panel identifier included in the first mapping is the same as a panel identifier included in the second mapping and the panel identifier is associated with a same physical panel.

27. The UE of claim 19, wherein the uplink reference signal includes a sounding reference signal for beam management, antenna switching, or codebook or non-codebook transmission, or some combination thereof.

28. An apparatus for wireless communication, comprising:
- a transceiver;
- a memory; and
- at least one processor coupled with the transceiver and the memory and configured to:
  - initiate transmission, via the transceiver, of at least one downlink reference signal;
  - receive, via the transceiver from a user equipment (UE) having at least first panel and a second panel, a first report including a first mapping of the at least one downlink reference signal to one or more panel identifiers;
  - initiate transmission, via the transceiver to the UE, of a configuration of an uplink reference signal resource;
  - receive, via the transceiver from the UE, an uplink reference signal in response to the configuration;
  - receive, via the transceiver from the UE, a second report including a second mapping between a selected panel identifier and the uplink reference signal;
  - initiate transmission, via the transceiver, of an uplink grant indicating a selected panel associated with the selected panel identifier; and
  - receive, via the transceiver, an uplink data channel transmitted from the UE using the selected panel.

29. The apparatus of claim 28, wherein the at least one processor is further configured to determine an action time when the second mapping is applicable.

30. The apparatus of claim 28, wherein the uplink grant indicates a downlink reference signal or an uplink reference signal associated with the selected panel identifier in the first mapping or the second mapping.

* * * * *